M. A. HANNON.
CLIP FOR CORNER BEADS.
APPLICATION FILED AUG. 25, 1906.
1,019,462. Patented Mar. 5, 1912.
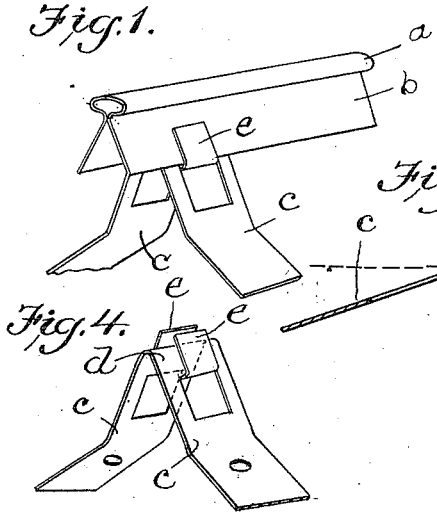
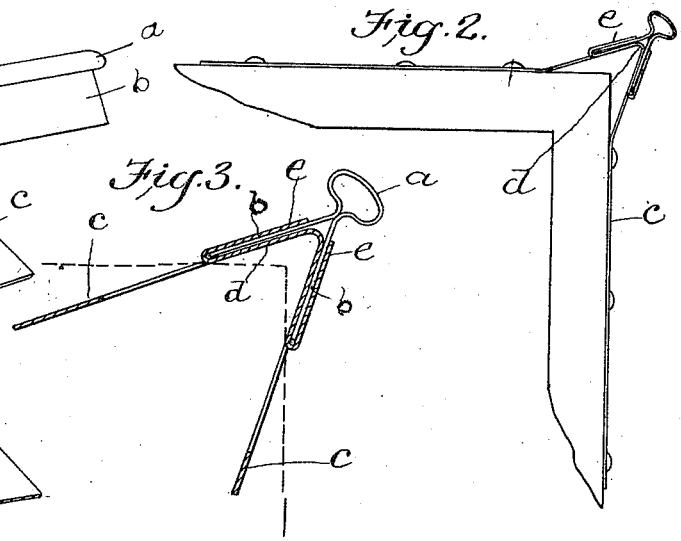
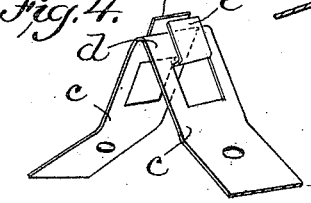
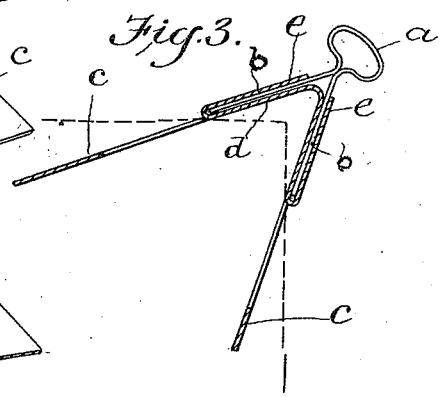
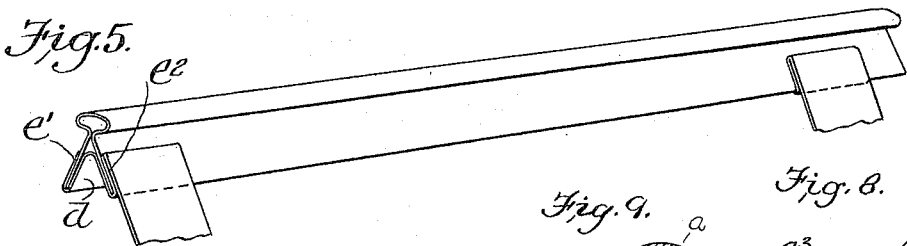
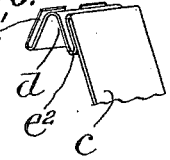
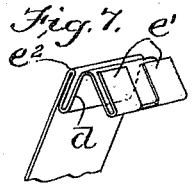
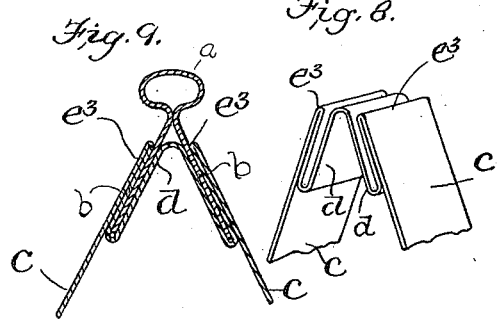
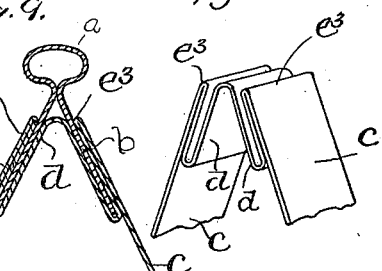
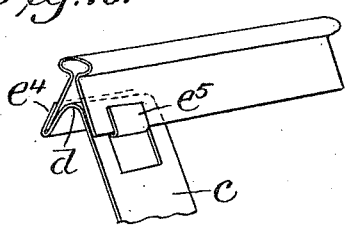
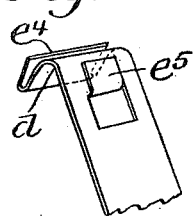
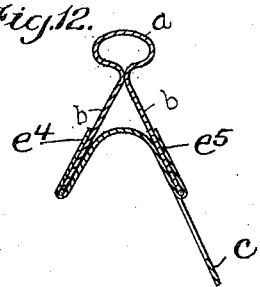
Witnesses.
A. L. Folsom.
E. Batchelder.
Inventor.
M. A. Hannon
by Wright Brown Quinby May
his Attys.
COLUMBIA PLANOGRAPH CO., WASHINGTON, D. C.

UNITED STATES PATENT OFFICE.

MICHAEL A. HANNON, OF BOSTON, MASSACHUSETTS.

CLIP FOR CORNER-BEADS.

1,019,462. Specification of Letters Patent. Patented Mar. 5, 1912.

Application filed August 25, 1906. Serial No. 332,041.

*To all whom it may concern:*

Be it known that I, MICHAEL A. HANNON, of Boston, in the county of Suffolk and State of Massachusetts, have invented certain new and useful Improvements in Clips for Corner-Beads, of which the following is a specification.

This invention has relation to corner beads and to means for securing them in position.

In the use of corner beads, such as that illustrated in the patent to DaCunha #290,750 dated December 25, 1883, or those illustrated in the patents to Union #560,605 dated May 19, 1896, Goodwin #595,298, dated December 14, 1897, it is desirable at times to attach them by means of a holder bracket instead of securing them in position by nails passed through apertures therein, and my invention therefore has for its object to provide certain improvements in brackets of this character, by means of which the bead may be located accurately and practically rigidly at a corner.

Referring to the accompanying drawings, Figure 1 represents in perspective view a portion of a DaCunha bead with one form of my improvement attached thereto. Fig. 2 represents the same attached to a corner, which is shown conventionally. Fig. 3 represents a section through the bracket and the bead. Fig. 4 represents a perspective view of the bracket detached. Fig. 5 represents in perspective view a portion of a bead with another form of bracket. Figs. 6 and 7 represent the bracket last referred to. Figs. 8 and 9 represent a third form of bracket embodying the invention. Figs. 10, 11 and 12 represent a fourth form of bracket embodying the invention.

The corner bead itself may vary in form, although I have illustrated it as having a curved or rounded portion or edge bead $a$ and diverging sides or wings $b\ b$. The portion $a$ may be circular, ovoid, elliptical or polygonal in cross-section, and the sides or wings which project outwardly and rearwardly therefrom form an angular recess or space, the angularity of which may vary as circumstances or requirements dictate.

The bracket, which is formed of a strip of metal, comprises one or more shanks or straps $c$ which may be attached to the wall or walls of the corner, an angular portion $d$ to extend into the angular recess between the sides $b\ b$ of the bead, and clamps or locking portions which embrace the exterior faces of said sides $b\ b$, said angular portion and clamps forming a V-shaped clip. In these respects all of the brackets, illustrated upon the drawings, are substantially the same although said clips vary as to the particular details of the clamps.

In the bracket shown in Figs. 1 to 4 inclusive, the clamping portions of the clips are formed by cutting from the body of the strip tongues $e\ e$ which are bent to overlap and bear against the outer faces of the sides $b\ b$.

In Figs. 5, 6 and 7, the bracket has but one shank or strap. One of the clamping portions is formed by bending one or more ears $e'\ e'$ at the end of the metallic strip so as to overlap one side $b$, and the other clamping portion is formed by doubling the strip first upward and then downward as illustrated at $e^2$.

In Figs. 8 and 9, the strip is bent to provide the angular portion $d$, and each half is bent twice upon itself as at $e^3\ e^3$ to form a V-shaped clip to engage between and about the sides or wings $b$.

The bracket shown in Figs. 10, 11 and 12 has one shank or strap and the clamps or clamping portion of the clip are formed by the end of the strip as at $e^4$ and by a tongue $e^5$ cut from the body thereof.

In each of the brackets thus referred to in detail, the clamps or clamping portions thereof converge or are at an angle to each other equal to the angle formed by the sides $b\ b$ of the bead so as to form a V-shaped clip, and each clamp locks one of said sides between it and one face of the angular portion $d$ of the clip. Thus the engagement of the clip and the bead is fairly rigid and secure. The brackets as furnished prior to their attachment, will have one clamp open so that they may be attached to the wings or sides of the bead; after which, by a suitable instrument, the clamp may be bent into locking position.

It is evident that what I have termed the "angular" portion of the clip may be curved as shown in Fig. 12.

By means of the bracket, the bead may be located at a corner so that its edges lie practically against the walls, or else the bead may be held a short distance away therefrom as may be desired.

Having thus explained the nature of the invention, and described a way of constructing and using the same, although without attempting to set forth all of the forms in which it may be made, or all of the modes of its use, I declare that what I claim is:—

1. The combination with a corner bead having divergent sides or wings forming an angular recess, of a bracket having an angular portion extending into said recess, a shank connected to said angular portion, and a clamp on each side of said angular portion to form a V-shaped clip, said clamps engaging the outer faces of said sides and being at an angle to each other, substantially as set forth.

2. The combination with a corner bead having divergent sides or wings forming an angular recess, of a bracket formed of a metallic strip and having an angular portion extending into said recess and engaging the inner faces of said sides, and converging tongues cut from the body of said strip and overlapping the outer faces of said sides so as to clamp said sides against said angular portion.

3. A bracket comprising a metallic strip bent to form an angle to project into the angular space between the sides of a corner-bead, converging clamps arranged at an angle to each other for coacting with the angular portion of said bracket to form a V-shaped clip, and a shank extending from the bent portion of said strip substantially as set forth.

4. The combination with a corner bead having an edge bead and divergent sides or wings, of a supplemental holder bracket having a V-shaped clip detachably engaging between and about said divergent sides or wings.

5. A corner bar for walls, comprising a body strip having an edge bead, and divergent wings at one side of the bead, and a supplemental holder bracket having a member detachably engaging between and about said wings.

6. A corner bar for walls, comprising a body strip having an edge bead, and divergent attaching wings at one side of the bead, and a supplemental holder bracket having a V-shaped clip detachably engaging between and about said wings.

In testimony whereof I have affixed my signature, in presence of two witnesses.

MICHAEL A. HANNON.

Witnesses:
M. B. May,
A. L. Folsom.

---

Copies of this patent may be obtained for five cents each, by addressing the "Commissioner of Patents, Washington, D. C."